June 8, 1948.    J. D. BUCHANAN    2,442,916
HYDRAULIC BOOSTER
Filed Nov. 5, 1945    6 Sheets-Sheet 1

INVENTOR:
J. D. BUCHANAN.
BY
W. W. Beatty
ATTORNEY.

June 8, 1948.  J. D. BUCHANAN  2,442,916
HYDRAULIC BOOSTER
Filed Nov. 5, 1945  6 Sheets-Sheet 2

INVENTOR:
J. D. BUCHANAN.
BY W. E. Beatty
ATTORNEY.

INVENTOR:
J. D. BUCHANAN.
BY
W. E. Beatty
ATTORNEY.

June 8, 1948.  J. D. BUCHANAN  2,442,916
HYDRAULIC BOOSTER
Filed Nov. 5, 1945  6 Sheets-Sheet 4

INVENTOR:
J. D. BUCHANAN.
BY
ATTORNEY.

June 8, 1948.  J. D. BUCHANAN  2,442,916
HYDRAULIC BOOSTER
Filed Nov. 5, 1945  6 Sheets-Sheet 5

INVENTOR:
J. D. BUCHANAN.
BY W. E. Beatty
ATTORNEY.

June 8, 1948.    J. D. BUCHANAN    2,442,916
HYDRAULIC BOOSTER
Filed Nov. 5, 1945    6 Sheets-Sheet 6

INVENTOR:
J. D. BUCHANAN.
BY
ATTORNEY.

Patented June 8, 1948

2,442,916

UNITED STATES PATENT OFFICE 2,442,916

HYDRAULIC BOOSTER

J. D. Buchanan, Burbank, Calif.

Application November 5, 1945, Serial No. 626,778

8 Claims. (Cl. 103—52)

The invention relates to an hydraulic booster and more particularly to hydraulic apparatus employing a differential pump piston having a comparatively large area acted on by a low pressure source, the piston having a comparatively small piston area employed to raise the pressure of the same source or another source of fluid by an amount approximating the ratio of the two areas of the piston. The pump piston is double acting, boosting the pressure at each stroke. While boosters employing double acting pump pistons have been proposed heretofore, the present invention is distinguished therefrom in improved arrangements of an hydraulic nature for controlling the pumping action, for the production of a high pressure fluid output of substantially constant velocity, assuming the working pressure is substantially constant. The invention further relates to an improved booster construction to facilitate its manufacture.

The present invention relates to a booster having two such pump pistons which are operated with overlapping strokes whereby each piston is pumping at a time when the other piston is at the end of its stroke, each piston being operated by a reversing valve, and each pump piston acting as a pilot valve for the reversing valve for the other pump piston. The pump pistons are thus controlled by reversing valves which are operated by fluid pressure under control of the pump pistons. Both pump pistons, their reversing valves and the working and control passages therefor are preferably arranged in a unitary structure. To facilitate the manufacture of the pump piston, the piston member is provided with a piston at each end thereof and with an intermediate portion of reduced diameter, whereby it is possible to use a cylinder liner of uniform diameter for the piston, a pumping space being provided inwardly of each piston by providing the cylinder liner with a packing gland for the reduced central portion of the piston member, the space between the packing gland and each inner end of the piston serving as a pumping space, one of which is on a suction stroke when the other is on a compression stroke.

The invention further provides a compact unit in which are assembled the two double pump pistons, two reversing valves, and eight check valves, two for each pump portion of each piston.

For further details of the invention reference may be made to the drawings wherein Fig. 1 is a schematic view of an hydraulic booster according to the present invention with a typical source of low working pressure.

Figs. 4 to 7, inclusive, are schematic simplified diagrams illustrating the sequence of operation of the pump pistons and their reversing valves.

Figure 3:
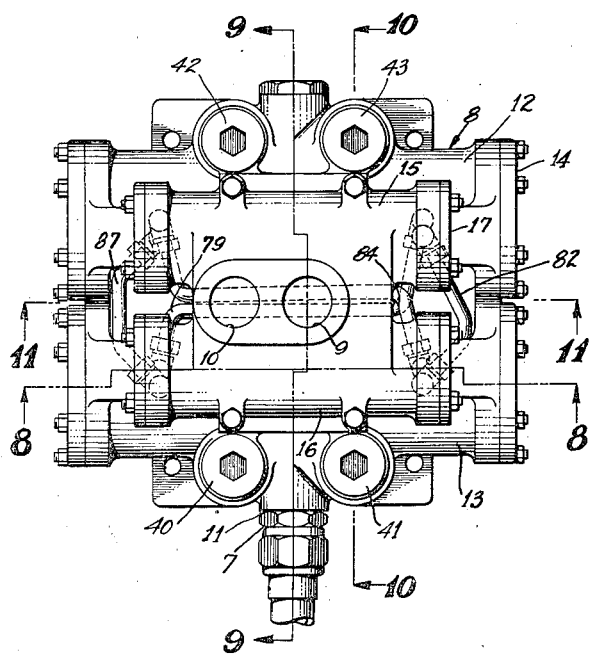
Fig. 3 is a top plan view of an hydraulic booster according to the present invention.

Figs. 8, 9, 10 and 11 are vertical sectional views looking in the direction of the arrows on the lines of the corresponding numbers in Fig. 3.

Figure 10:
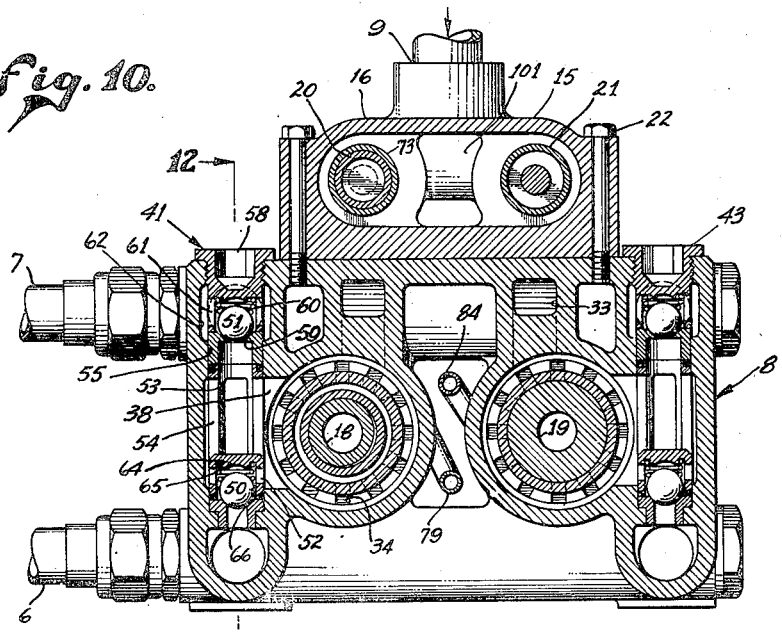
Figure 12:
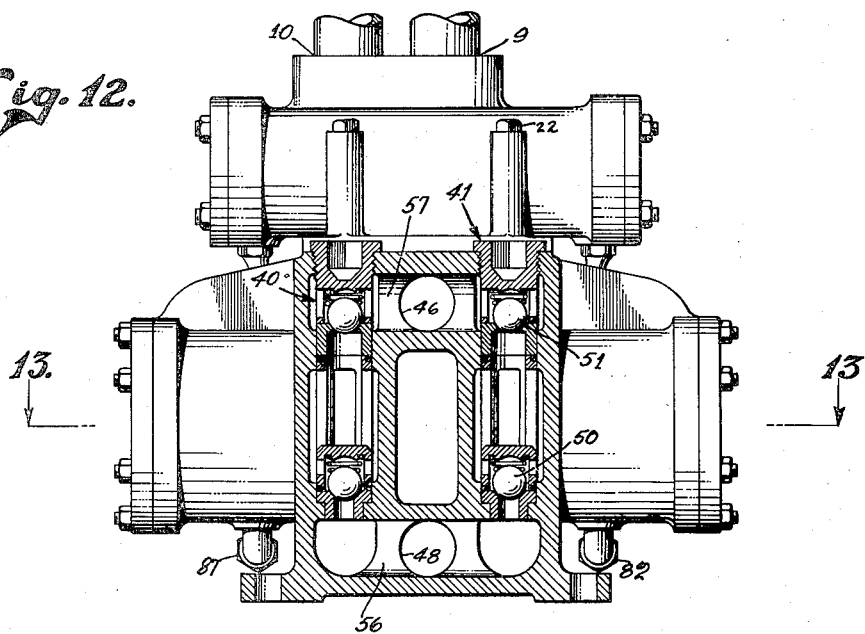

Fig. 12 is a vertical sectional view on line 12—12 of Fig. 10 looking in the direction of the arrows.

Figure 13:
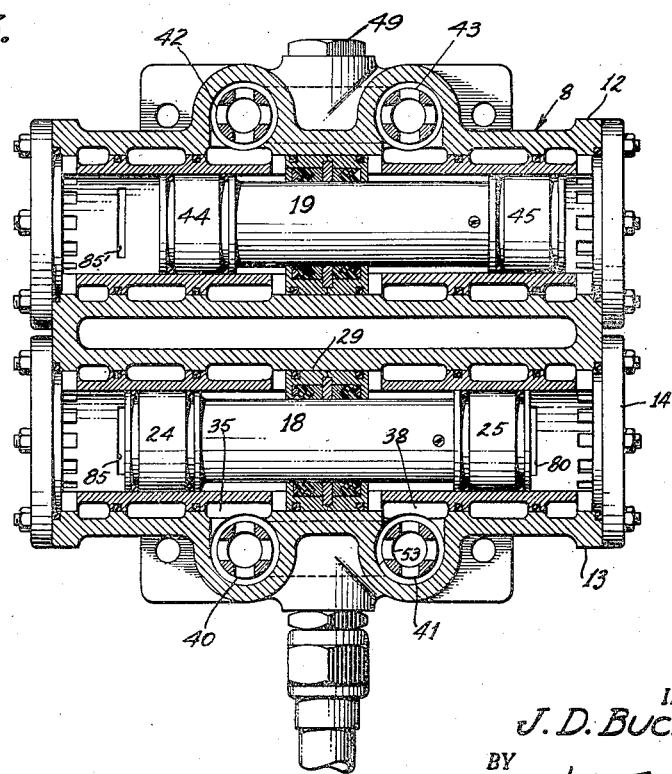

Fig. 13 is a horizontal sectional view on line 13—13 of Fig. 12 looking in the direction of the arrows.

Referring in detail to the drawings, the booster 1 comprises differential pumping mechanism later described which may be operated by low pressure fluid delivered for example by pump 2 from a sump 3 to the pipe 4. The low pressure fluid in pipe 4 is hereafter referred to as the working pressure or working fluid and after operating the pumping mechanism in booster 1 it is returned by pipe 5 to the sump 3. Fluid under pressure, either from pump 2 or from some other source, is supplied to the high pressure suction or inlet 6 and this fluid is delivered at higher pressure to the high pressure outlet 7.

Figure 1:
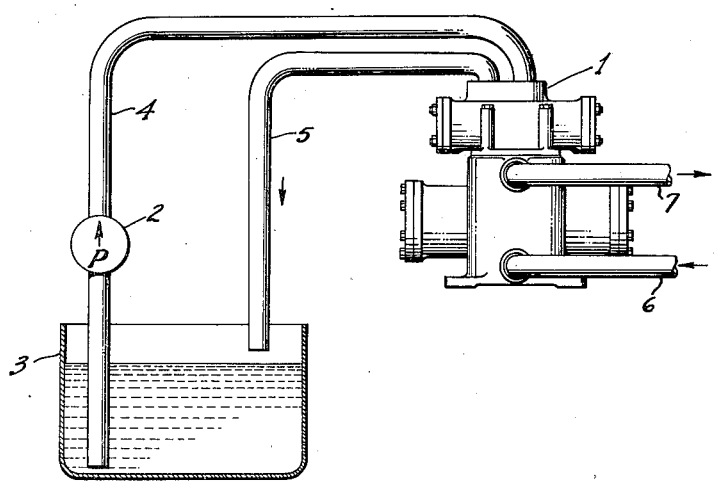

Referring to Fig. 3 which is a top plan view of the booster 1 in Fig. 1, the booster comprises a casing 8 having an inlet 9 for the low pressure inlet 4, an outlet 10 for the low pressure outlet 5 for the working fluid, an outlet 11 for the high pressure outlet 7 and directly therebelow an inlet, not shown in Fig. 3 (but indicated at 23 in Fig. 9), for the high pressure inlet 6 in Fig. 1. The casing 8 has two parallel pump cylinders 12 and 13 closed at their opposite ends by cylinder heads such as indicated at 14. Above the pump cylinders 12, 13 and parallel thereto, are reversing valve cylinders 15, 16, each closed at its opposite ends by cylinder heads such as indicated at 17 in Fig. 3 and at 74 and 75 in Fig. 8. Each of the pump cylinders 12, 13 has a double acting differential pump piston, the piston for cylinder 13 being indicated at 18 in Fig. 8, both piston 18 and the other piston 19 appearing in Figs. 9, 10 and 13. Each of the reversing valve cylinders 15 and 16 houses a reversing valve, the reversing valve for cylinder 16 being indicated at 20 in Fig. 8, both reversing valve 20 and the other reversing valve 21 appearing in Figs. 9 and 10. The reversing valve 20 reverses the direction of movement of the pump piston 18 directly below it, while this reversing valve 20 is hydraulically operated under control of the pump piston 19 in the other pump cylinder 12. The pump piston 19 in pump cylinder 12 is reversed by the reversing valve 21 immediately above it in cylinder 15 and this reversing valve 21 is hydraulically operated under control of the other pump piston 18 in pump cylinder 13.

Figure 9:
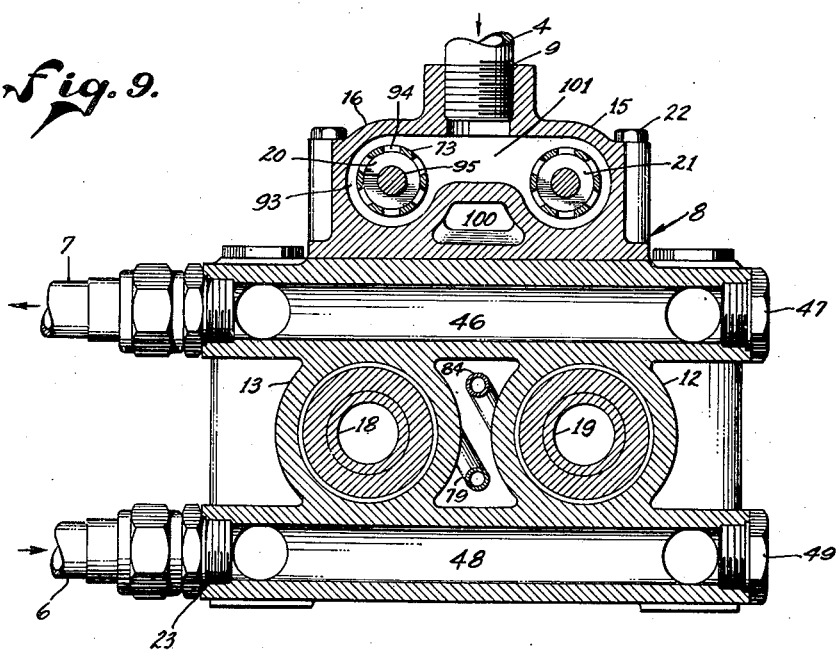

As indicated in Fig. 9, the pump cylinders 12, 13 may be cast in one block, the reversing valve cylinders 15, 16 in another block fitting on top thereof and secured thereto by bolts such as indicated at 22. These two blocks form the casing 8.

Figure 8:
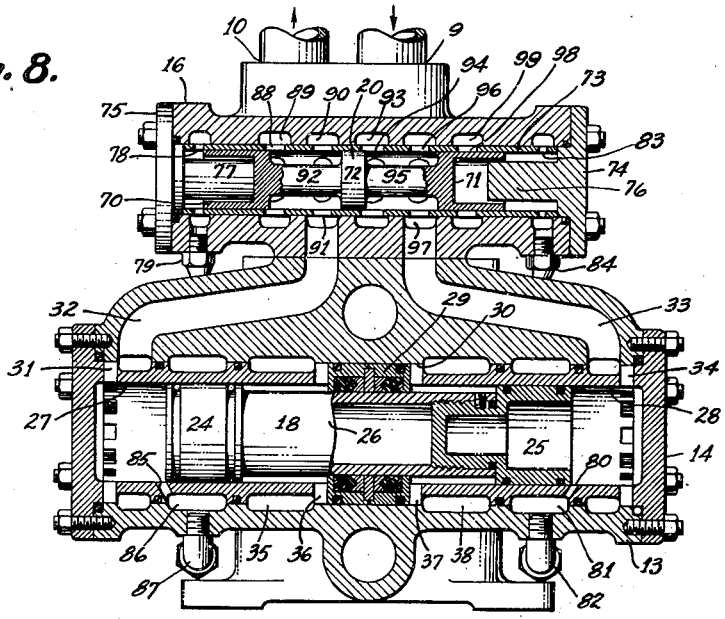

Both of the pump pistons 18, 19 are alike in construction. As shown in Figs. 8 and 13, piston 18 has a piston head 24 and a piston head 25 at opposite ends of a tubular member 26, the latter being of smaller diameter than the piston heads 24, 25. Piston head 24 slides in a cylinder liner 27 and piston head 25 slides in a cylinder liner 28. Between cylinder liners 27 and 28 is arranged a suitable packing gland 29 in which the member 26 slidingly fits. The outside diameter of the liners 27, 28 and the gland 29 are substantially the same and they fit in a bore 30 in the pump casing 8. The bore 30 and the outside of the liners 27, 28 have a number of opposed cored or cutaway portions to provide annular passages around the liners, as later described. The outer end of liner 27 has an annular array of cutaway portions such as indicated at 31 whereby the pressure or discharge of the working fluid in passage 32 may communicate with the outer end of piston head 24. Similarly the working pressure or exhaust in passage 33 is communicated to the outer end of piston head 25 through a suitable annular array of ports or openings 34 in the outer end of liner 28.

When piston 18, as shown in Fig. 8, is moving to the left, piston head 24 is on its suction stroke as the pumping space between the inner end of piston head 24 and the left side of gland 29 is increasing in size, and fluid of which the pressure is to be increased is admitted into this space from the annular passage 35 through an annular array of ports such as 36 in the inner end of liner 27. Similarly the space between the inner end of piston 25 and the right hand side of gland 29 is decreasing in size and the fluid previously admitted to that space is increased in pressure and pumped out through an annular array of ports such as 37 to the annular passage 38.

The ratio of the boost in pressure is substantially the same as the ratio of the area of the outer end of the piston heads such as 25, to the area determined by the difference in the area of piston head 25 and the area of the cylinder connecting member 26. With the relative dimensions shown in the drawings this ratio is of the order of five to one, although other ratios may be used.

A check valve unit is provided for each of the two pumping spaces which exist for each of the two pump pistons 18 and 19, and the four check valve units 40, 41, 42, 43, a top view of which appears in Fig. 3, are arranged in pairs at opposite sides of the two pistons 18, 19 and at right angles thereto.

As shown in Fig. 13, check valve unit 40 handles the suction and high pressure outlet for the pump action produced by piston head 24, check valve unit 41 handles the flow pumped by piston head 25, check valve unit 42 handles the flow pumped by piston head 44 and check valve unit 43 handles the flow pumped by piston head 45. Referring to Fig. 9, the casing 8 has a through passage 46 extending at right angles to and above the pistons 18 and 19. Passage 46 communicates with the high pressure outlet 7 and it may have at one end thereof a plug 47 so that the outlet pipe may be connected to either end of passage 46 and the plug 47 secured at the other end. Also casing 8 has below pistons 18 and 19 and parallel to passage 46, a through passage 48 which communicates with the high pressure suction inlet 6. Passage 48 is likewise threaded at both ends and has a cap 49 at one end so that this cap may close either end of passage 48 and the inlet connection made at the other end. Referring to Fig. 13, the check valve units 40 and 42 extend on one side of the high pressure passages 46 and 48 and check valve units 41, 43 extend on the other side of passages 46 and 48.

All four of the check valve units 40—43 are alike in construction and for example, as shown in Figs. 10 and 13, pump passage 38 on a suction stroke opens inlet check valve 50 and closes outlet check valve 51, and when on a pumping or pressure stroke, closes check valve 50 and opens check valve 51. On a suction stroke the fluid flows past valve 50 through ports 52 in a cage 53 to the pumping space 38, and on a pressure stroke the fluid flows from passage 38 through openings 54 in cage 53, past valve 51 to outlet 7.

The check valve unit 41 is removably held in a bore 55 in casing 8, by a cap 58. Check valve 51 is held to its seat 59 by a spring 60 between cap 58 and valve 51. Cap 58 at its inner end forms a cage having discharge openings 61 and the bore 55 is enlarged around those openings as indicated at 62. Cap 58 holds its cage on seat 59 which bears on the top of cage 53. Bore 55 is enlarged around openings 54 as indicated at 63. Cage 53 at its lower end has a stop 64 for valve 50 and spring 65 is arranged between stop 64 and valve 50 to hold the latter to its seat 66, the lower end of cage 53 bearing on the top of seat 66.

The suction or inlet end of all four of the inlet check valves like 50 are connected to the suction inlet 6 by reason of the fact that inlet passage 48 shown in Fig. 9 branches at its opposite ends, the branch passage for check valve units 40, 41 being indicated at 56 in Fig. 12. Similarly the discharge end of all four check valve units 40—43 feed into the high pressure outlet 7, by reason of the fact that the outlet passage 46 shown in Fig. 9 branches at its opposite ends, the branch passage for valve units 40 and 41 being indicated at 57 in Fig. 12.

The reversing valves 20 and 21 are similar in construction and in operation, although they operate out of phase and at different times, as later described. As shown in Fig. 8, reversing valve 20 has a hollow piston 70 at one end, a hollow piston 71 at the other end and an intermediate cylinder valve head 72, all of the same diameter and slidably fitting in a cylinder liner 73 held in cylinder 16 by heads 74 and 75. Head 74 has an inwardly projecting cylindrical portion 76 which extends in and forms a stop for the hollow piston 71, and head 75 has a similar stop 77 for hollow piston 70. Liner 73 has seven annular arrays of ports and cylinder 16 has an annular cored passage for each such array, to wit, liner 73 has at its left end ports 78 which communicate with pipe 79 and at its right end ports 83 which communicate with pipe 84, to operate valve 20 by admitting pressure to the outer end of either piston 70, or 71 and connect the outer end of the other piston to exhaust. Port 80 is opened or closed by piston head 25 and is arranged in liner 28 at a point intermediate the travel of piston head 25. Port 80 communicates with an annular passage 81, partly in liner 28 and partly in casing 8, passage 81 being connected to pipe 82.

Pump piston 24 opens and closes a port 85 in liner 27, similar to port 80, at an intermediate point in its travel, port 85 communicating with an annular space 86, partly in liner 27, partly in casing 8, space 86 being connected to a pipe 87.

The length of piston 18 is such that both ports 80 and 85 are open at the same time, whereby the one of these ports which is on the pressure side of pump piston 18 opens completely before the other port which is on the exhaust side begins to close, to shift reversing valve 21 to its alternate position, both reversing valves 20 and 21 being fast acting. The distance from port 80 to the outer end of its liner 28 is the same as the distance from port 85 to the outer end of its liner 27 and that distance is less than the length of piston heads 24 and 25, whereby when either of these ports is closed by outward movement of its piston 24 or 25 that port remains closed until the piston head reaches the end of its stroke and returns to a position opening the port. The same arrangement of ports like 80 and 85 are provided for the other pump piston 19, the port corresponding to 80 being referred to as 80' and the port corresponding to 85 being referred to as 85'.

The pump piston 18, by controlling ports 80, 85, acts as a pilot valve for the reversing valve 21 for the other pump piston 19, and similarly pump piston 19, by controlling ports 80', 85' acts as a pilot valve for reversing valve 20. However, the connections from those ports to their respective reversing valves is reversed for one of those reversing valves. Accordingly, port 85 at the left end of piston 18 is connected by pipe 87 to the left end of 21 (see Figs. 3, 8 and 11) and the port 80 at the right end of piston 18 is connected by pipe 82 to the right end of valve 21. However, the port 85' at the left end of piston 19 is connected by pipe 84 to the right end of valve 20, and port 80' at the right end of piston 19 is connected by pipe 79 to the left end of valve 20. The purpose of this is to cause pump pistons 18 and 19 to have overlapping strokes, each being active when the other is idle, to reduce pulsations in the high pressure output.

As shown in Fig. 9, pump cylinders 12 and 13 may be spaced apart and pipes 79 and 84 may extend in the space between those cylinders.

Figure 11:
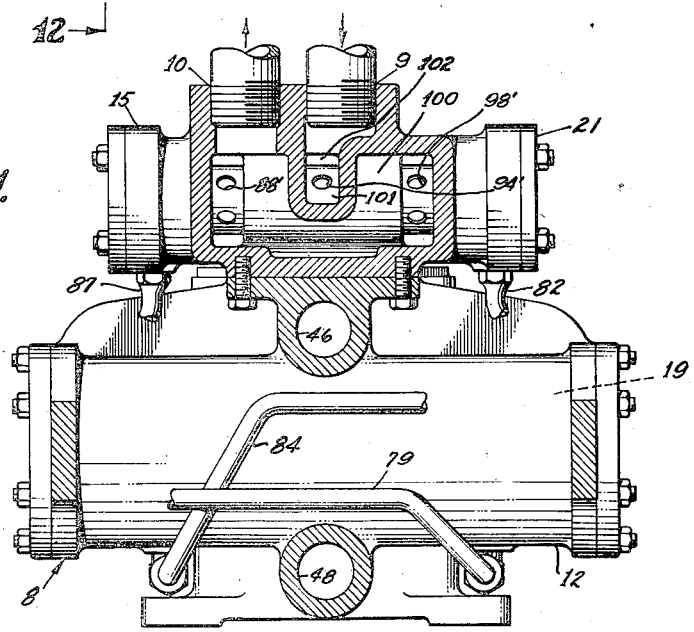

Liner 73 has an annular array of ports 88 communicating with an annular space 89 which leads to the working fluid outlet 10. When reversing valve 20 is in the position shown in Fig. 8, exhaust ports 88 are open to connect the space at the outer end of piston head 24, through passage 32, through annular passage 90 and ports 91 in liner 73, around reduced stem 92 through exhaust ports 88 and space 89 through the working fluid outlet 10. At this time, the intermediate valve portion 72 admits the working pressure at inlet 9 through annular space 93 through inlet ports 94 in liner 73, around reduced stem 95, through annular ports 96 in liner 73 and annular space 97 and passage 33 to the right end of piston head 25. Also at this time, the hollow piston 71 closes the annular array of exhaust ports 98 in liner 73, these ports communicating with an annular space 99 which is connected through a longitudinal cored passage 100 shown in Fig. 11 with the working pressure outlet 10. As shown in Fig. 11, the exhaust passage 100 also connects exhaust ports 88' and 98' for reversing valve 21, corresponding to exhaust ports 88 and 98 of reversing valve 20, to the working pressure outlet 10.

When reversing valve 20 is in its alternate position in Fig. 8, exhaust ports 88 are closed by piston 70, the working pressure in inlet 9 being communicated to the left end of piston head 24, and the right end of piston head 25 being connected through passage 33 and exhaust ports 98 and passage 100 to the working pressure outlet 10.

The annular passage 93 which communicates with the working pressure inlet 9 communicates with a crosswise cored passage 101 shown in Figs. 10 and 11 whereby the working pressure fluid in inlet 9 is communicated not only to the annular space 93 for reversing valve 20, but to the similar annular space 102 and inlet ports 94' corresponding to inlet ports 94 in Fig. 8 for the other reversing valve 21, as shown in Fig. 11.

Figure 2:
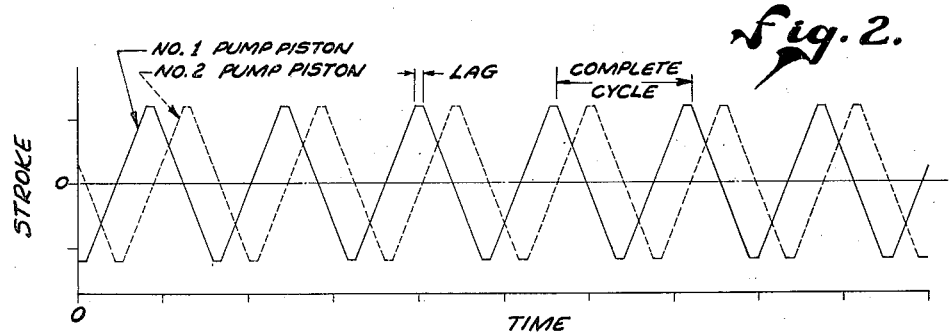
Fig. 2 is a schematic diagram illustrating the overlapping strokes of the two pistons.

The operation of the booster above described, will now be explained. Fig. 2 illustrates the overlapping strokes of the two pump pistons, the number 1 pump piston corresponding to piston 18 and the other figures, and No. 2 corresponding to piston 19. As indicated in Fig. 2, the strokes of the two pump pistons overlap, one being active when the other is idle.

The operation will be further described in connection with the schematic drawings in Figs. 4-7, wherein the apparatus is spread out. If the right hand half of each of the drawings in Figs. 4-7, inclusive, is swung rearwardly 180° about a vertical line through the middle of each drawing, so that pump piston 19 will extend parallel to and behind piston 18 and valve 21 similarly will extend behind and parallel to valve 20, the space relation of the pistons and valves in Figs. 4-7 will be the same as in the actual apparatus in Figs. 3 and 8-13. The piping connections referred to above in connection with Figs. 3, 8 and 11 will also apply to Figs. 4-7, inclusive, bearing in mind that the left end of valve 21 and the left end of piston 19, as they appear in Figs. 4-7, are actually the right hand ends thereof in the apparatus shown in the figures such as Figs. 3, 8-13. While the space relation of pump pistons and reversing valves shown in the apparatus of Figs. 3 and 8 to 13 is preferred, as the various elements are associated in a compact structure, various other space relations may be employed.

In setting the booster into operation, if the pump pistons 18, 19 are not initially out of phase with each other, they may be moved to out-of-phase relation by temporarily admitting pressure to one end or the other of one of the pump pistons, or one of the reversing valves over temporary fluid pressure lines, not shown.

Figure 4:
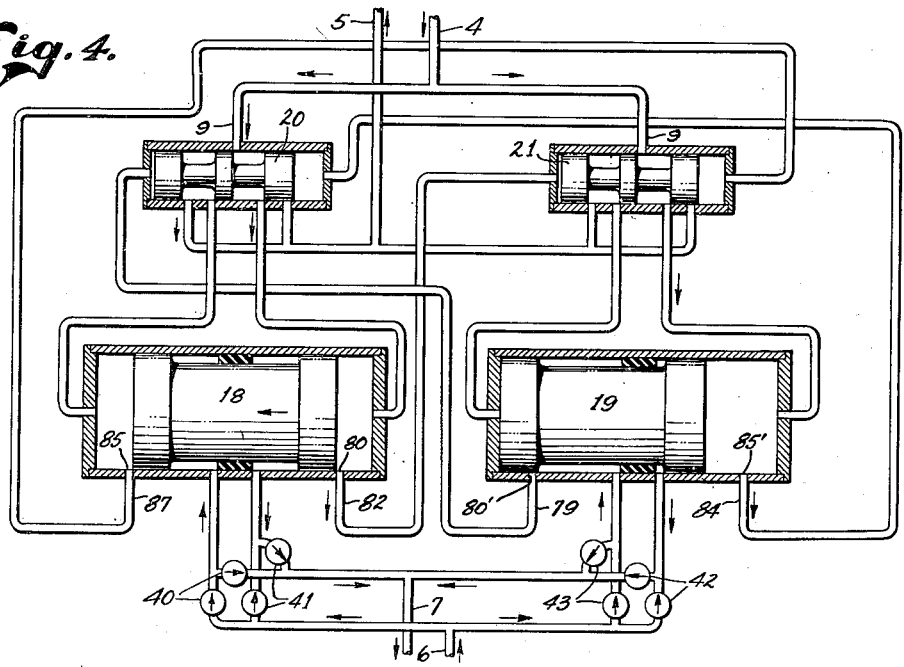
Figure 5:
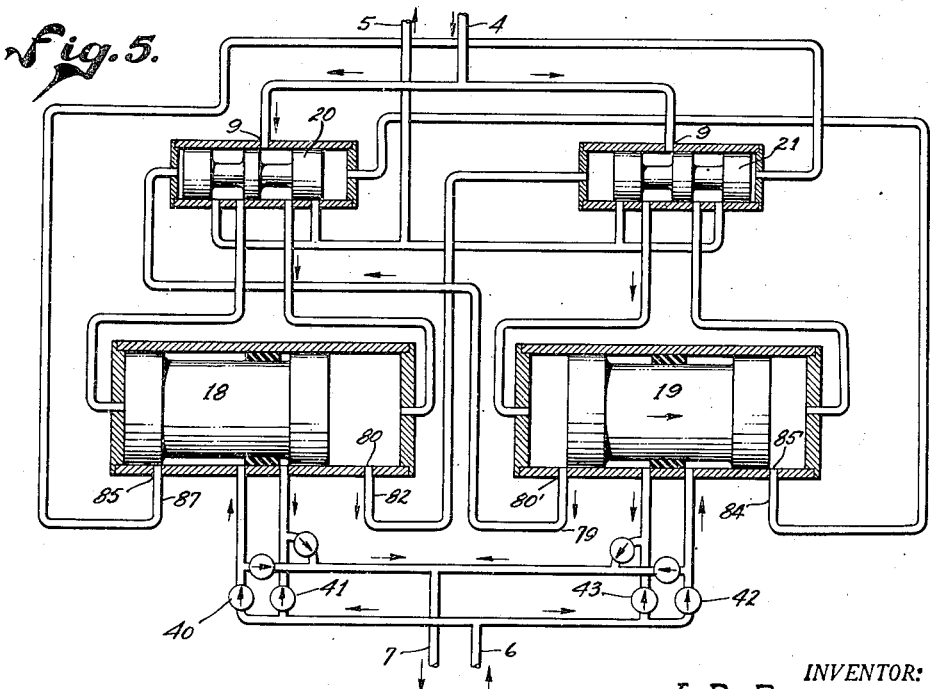
Figure 6:
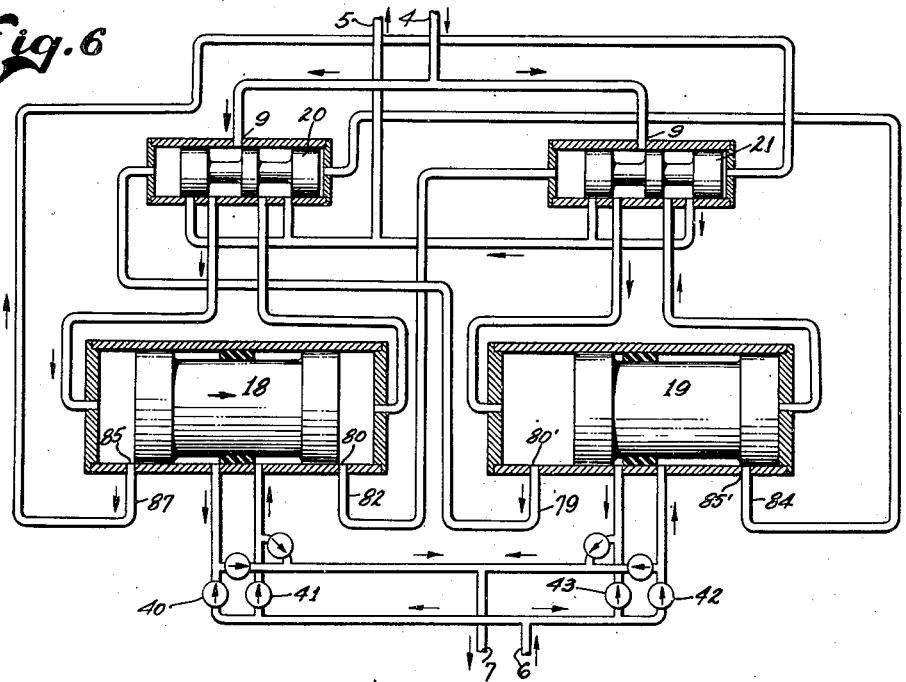
Figure 7:
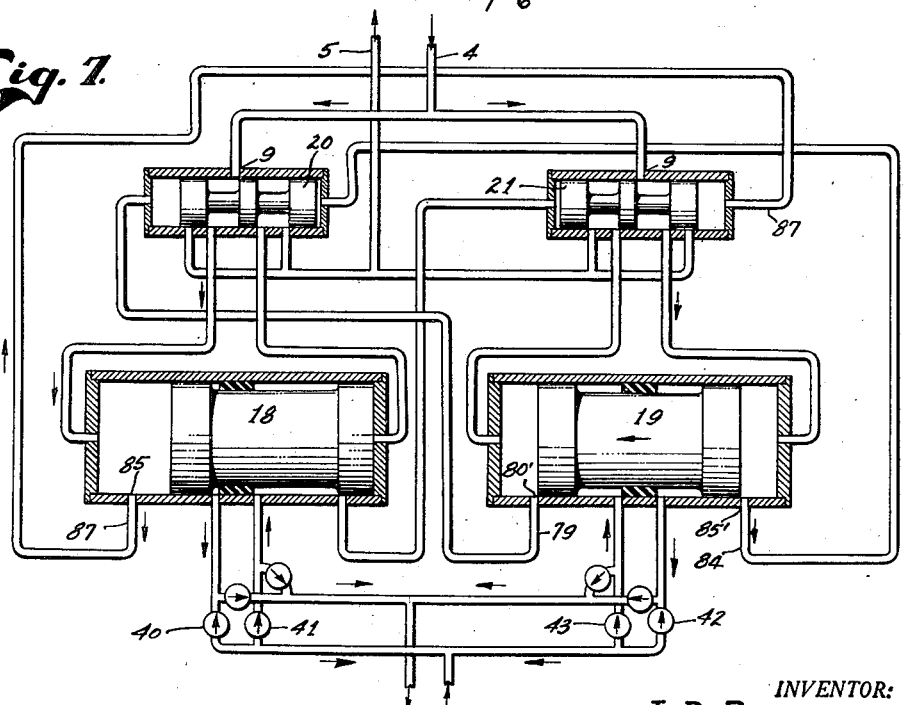

Hereafter, reference will be made to the right or left end of the valves or pistons as they actually appear in Figs. 4-7. Referring to Fig. 4, the working pressure in inlet 4 as controlled by valve 21, is applied to the right end of pump piston 19 which has reached the end of its stroke and to the right end of valve 20 which has also reached the end of its stroke. The working pressure in inlet 4 as controlled by valve 20, is applied to the right end of piston 18 which is at an intermediate position in its stroke and traveling to the left. At the moment shown in Fig. 4, piston 18 has uncovered port 80 which communicates the pressure on the right end of piston 18 to reversing valve 21 which is fast acting and moves to its alternate position to the right before pump piston 18 closes port 85. Thereafter, as shown in Fig. 5, piston 18 completes its stroke to the left and in so doing maintains port 85 closed, which is of no consequence because valve 21 has already moved to the end of its stroke to the right, valve 21 being in position to admit the working pressure in pipe 4 to the left end of piston 19 which travels to the right until it uncovers port 80' at a time when port 85' is also open, thereby communicating the pressure on the left end of piston 19 to the left end of valve 21 which is quick acting and moves to the right and remains there while piston 19 is completing its stroke to the right. Piston 19 moves from the position shown in Fig. 5 to the end of its stroke at the right as shown in Fig. 6, while piston 18 moves from the end of its stroke as shown in Fig. 5 to the position shown in Fig. 6. Piston 18 in the position shown in Fig. 6 uncovers both ports 85 and 80 thereby admitting the working pressure on the left end of piston 18 and on the right end of valve 21 which moves to its alternate position shown in Fig. 7. While piston 18 is completing its stroke to the right from a position shown in Fig. 6 to the end of its stroke shown in Fig. 7, piston 19 moves to the left to the position shown in Fig. 7 whereby the working pressure on the right end of piston 19 is communicated through port 85' to the right end of valve 20 which moves to its alternate position to the left. Pump piston 19 then completes its stroke to the left and piston 18 moves in the course of its travel to a position uncovering ports 85 and 80 which is the condition shown in Fig. 4. The cycle of operations above described is, of course, repeated and each of the pump pistons 18, 19 pump and boost the pressure on its stroke in each direction.

It will be apparent that various modifications may be made in the invention without departing from the spirit of the following claims.

I claim:

1. A hydraulic booster comprising a pair of fluid pressure operated differential double acting pump pistons each having two pump and two motor piston areas, a fluid pressure operated reversing valve for the motor piston areas of each of said pistons, and means for operating said pistons out of phase with each other whereby one piston is at an intermediate position in its stroke when the other piston is at either end of its stroke, said means comprising fluid pressure operated means actuated when each of said pistons is at an intermediate position in each stroke for actuating the reversing valve for the motor piston areas of the other piston.

2. A hydraulic booster comprising a pair of fluid pressure operated differential double acting pump pistons each having motor piston areas, a fluid pressure operated reversing valve for the motor piston areas of each of said pistons, and means comprising ports controlled by each of said pistons and passages between the ports of one piston and the reversing valve of the other piston whereby each of said pistons acts as a pilot valve for the reversing valve of the other piston.

3. A hydraulic booster comprising a pair of fluid pressure operated differential double acting pump pistons each having motor piston areas, a fluid pressure operated reversing valve for the motor piston areas of each of said pistons, and means comprising fluid pressure and exhaust passages controlled by each of said pump pistons whereby each of said pump pistons serves as a pilot valve for the reversing valve for the other pump piston.

4. A hydraulic booster comprising a pair of fluid pressure operated differential double acting motor-pump piston members, a fluid pressure operated reversing valve for the motor side of each of said piston members, and means comprising ports controlled by the movement of each of said piston members for hydraulically operating the reversing valve for the other piston member.

5. A hydraulic booster comprising two pump cylinders, a fluid motor double acting pump piston for each of said cylinders, two valve cylinders, a reversing valve for each of said valve cylinders, fluid passages whereby each of said valves is adapted to alternately connect the opposite ends of one of said pump cylinders with a fluid pressure inlet and an exhaust respectively, each of said pump cylinders having two ports adapted to be opened or closed by the piston in its travel, the said ports of each pump cylinder being spaced apart farther than the length of the piston whereby the port on the pressure side is fully open before the port on the exhaust side begins to close, and passages connecting the two ports of each pump cylinder to the opposite ends respectively, of the valve cylinder for the other pump piston, each of said reversing valves being fast acting and said pump pistons having overlapping strokes.

6. A hydraulic booster comprising a pair of fluid pressure operated differential double acting motor-pump piston members, hydraulic means for operating said motor pump piston members with overlapping strokes, said means comprising a port intermediate each stroke of each of said piston members, a fluid pressure operated reversing valve for the motor side of each of said piston members, and means comprising passages controlled by the ports for each piston member for operating the reversing valve for the other piston member.

7. Hydraulic booster apparatus comprising a pump cylinder block having therein a pair of horizontal parallel pump cylinders extending side by side, a double differential pump piston in each of said cylinders, a reversing valve block on top of said first block, a pair of horizontal parallel reversing valve cylinders in said valve block, a reversing valve in each of said valve cylinders for each of said pistons, two vertical check valve wells in said first block for each of said double pump pistons, a double check valve in each of said wells, said valve block having a working fluid pressure inlet passage and a working fluid pressure exhaust passage for both of said reversing valves, said valve block and said pump block having communicating passages connecting both ends of each piston with one of said valves, said pump block having a high pressure suction passage and a high pressure outlet passage communicating with all four of said check valve wells, said pump block having a pair of pump passages for each piston, each pump passage communicating with one of said check valve wells, and means for operating each of said reversing valves under control of one of said pump pistons.

8. A hydraulic booster according to claim 2 comprising a block for both of said pistons, a valve block for both of said reversing valves, said valve block having an inlet and an exhaust, said blocks fitting together and having communicating passages controlled by said valves and connecting said inlet and exhaust with said pistons.

J. D. BUCHANAN.

REFERENCES CITED

The following references are of record in the file of this patent:

UNITED STATES PATENTS

| Number | Name | Date |
|---|---|---|
| 323,346 | Leavitt | July 28, 1885 |
| 1,161,787 | Nichol | Nov. 23, 1915 |
| 2,293,076 | Ponting | Aug. 18, 1942 |
| 2,336,446 | Tucker, et al. | Dec. 7, 1943 |